United States Patent

[11] 3,612,693

| [72] | Inventor | Karl A. Stetson<br>Richmond, Surrey, England |
|---|---|---|
| [21] | Appl. No. | 37,723 |
| [22] | Filed | May 15, 1970 |
| [45] | Patented | Oct. 12, 1971 |
| [73] | Assignee | GC Optronics, Inc.<br>Ann Arbor, Mich. |

[54] METHOD FOR MEASUREMENT OF SURFACE PROFILE CHANGE USING A VERNIER SCALE IN HOLOGRAM INTERFEROMETRY
5 Claims, 5 Drawing Figs.

[52] U.S. Cl. ............................................. 356/109, 310/3.5
[51] Int. Cl. ............................................. G01b 9/02, G02b
[50] Field of Search ........................................ 356/106–113; 73/71.3; 350/3.5

[56] References Cited
UNITED STATES PATENTS
3,552,858  1/1971  Haines et al. ................. 356/109

*Primary Examiner*—Ronald L. Wibert
*Assistant Examiner*—Conrad Clark
*Attorney*—Barnard, McGlynn & Reising ABSTRACT: To measure the amount of surface profile change of an object, a hologram is formed by recording on a photographic media the interference pattern between coherent light divided between a uniform, reproducible wave front and mutually coherent light reflected from the object. The virtual image of the object as seen through the hologram formed by the developed photographic media, properly illuminated, is superimposed on the same object with the object being inclined with respect to the virtual image by a predetermined amount. The positions of the object and the virtual image are adjusted to result in the formation of fringes which are spaced apart from one another by a first predetermined scale length. Changes in the profile of a section of the object will result in a shifting of those fringes associated with the unchanged portion. The fringe shift may be measured by employing a second scale having divisions which differ from those of the first scale, in the manner of a vernier scale, such fringe shift being a function of the surface profile change.

PATENTED OCT 12 1971    3,612,693

INVENTOR
Karl A. Stetson

METHOD FOR MEASUREMENT OF SURFACE PROFILE CHANGE USING A VERNIER SCALE IN HOLOGRAM INTERFEROMETRY

This invention relates to a method of measuring local surface profile changes of an object employing techniques of holographic interferometry as a tool of analysis.

Methods and apparatus for forming holograms have undergone intensive development and improvement in the past few years. These holograms consist of photographic records of the interference pattern between light (generally coherent light as produced by a laser) arriving at a reflected media directly from a source and light which is reflected from an object illuminated by the same source.

Upon development of the photographic media and proper illumination of the resulting hologram, an optical reconstruction of the original object having optical properties identical to those of the object may be viewed. Methods have also been developed for detecting minute dimensional changes in the object, or anomalies in its dimensional change pattern, by forming a hologram of an object in its initial state and then by viewing the object through the developed hologram under an illumination arrangement substantially identical to that used during the formation of the hologram so that the optical reconstruction of the object is superimposed on the object itself. If the object is displaced from its initail state, as for example by movement, or its dimensions are changed, interference between light reflected by the object and light reaching the eye from the source through the hologram results in apparent fringes wherein the fringe array is a function of the dimensional change of the object. This real-time holographic technique is useful for a number of purposes such as determining the dynamic states of a vibrating object, the detection of flaws, and the measurement of thermal expansion.

Previous attempts have been made to use holographic interferometry to measure material removal or material buildup on an object resulting from localized effects such as corrosion.

Studies have revealed that exposing one portion of an object surface to a profile change will result (in a subsequent holographic interferometric study) in a relative shift of the fringes that run across both the changed portions and unchanged portions of the object, and that an accurate measurement of this shift makes possible the measurement of the degree of material removal or buildup, if the profile change is associated with corrosion.

The present invention broadly contemplates the measurement of localized dimensional changes on the surface of an object which has been subjected to some type of profile change.

In the practice of the method described herein, a hologram is formed of an object by simultaneously exposing a photographic media to a reference beam from a source of coherent light reflected from the object. The photographic media is then developed so as to form the hologram. The object is then shifted from its original position as by slightly rotating or inclining the object. By proper illumination of the hologram, the virtual image of the object as seen through the hologram is superimposed upon the shifted image of the object wherein straight fringes are arrayed in a pattern on the object which is a function of the amount of inclination of the object. By proper movement of the object the fringes may be spaced apart by a predetermined scale length. An area of the object surface is then subjected to a profile change producing a shift of the fringe lines associated with that area. The departure of the shifted fringes from the unshifted fringes can be determined by photographing the resultant superimposed images as seen through the hologram, comparing the fringes against a scale of slightly different period and measuring the distance between a coincidence in the changed areas and a corresponding coincidence in the unchanged areas of the object in the same manner as one reads a vernier scale.

It is therefore, a primary object of the present invention to provide a method of measuring the amount of material buildup or material removal of an object resulting from corrosion by means of holographic interferometry.

Other objects, advantages and applications of the invention will be made apparent by the following detailed description thereof.

The description makes reference to the accompanying drawings in which like reference characters refer to like parts throughout the several views and in which.

Figure 1:
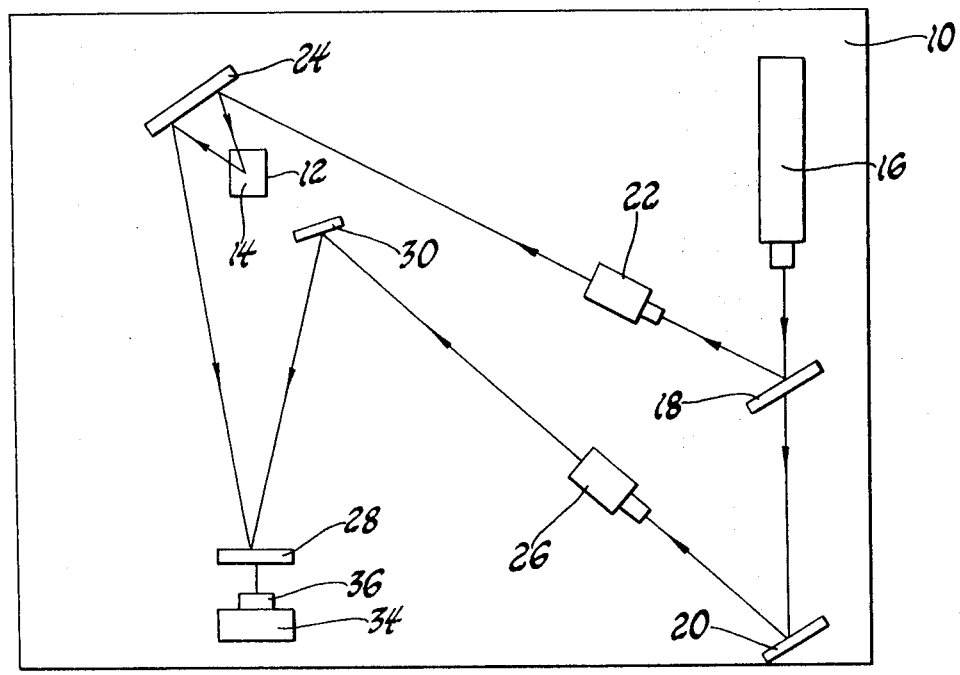
FIG. 1 is a schematic diagram illustrating apparatus employed in the practice of a preferred embodiment of the invention.
Figure 2:
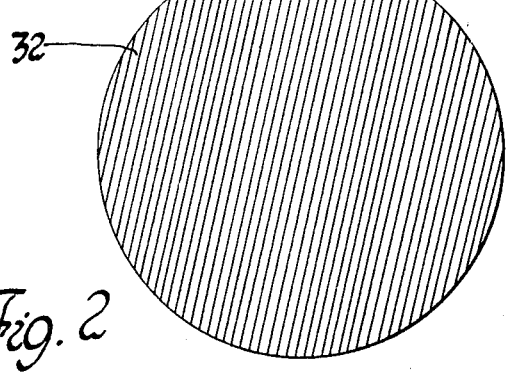
FIG. 2 is an enlarged view of an object with the virtual image (as seen through the hologram) superimposed thereon, in which the object has been inclined with respect to its original position to create a pattern of straight fringes over the objects's surface.

The apparatus for practicing any of the embodiments of the present invention such as real-time analysis or double-exposure analysis may take substantially the same form. A representative arrangement for determining surface profile change such as the degree to which the material is removed or built up on a surface of an object, e.g., as the result of corrosion taking place thereon, by any of these techniques of holographic interferometry, is illustrated in FIG. 1. In the arrangement in FIG. 1, the hologram-making apparatus is supported on a granite table 10 to give the apparatus a high degree of stability. An object 12 to be examined is fixed by any suitable means to a stand (not shown). The stand should be of such a design as to enable a planar surface 14 of the object to be inclined with respect to the horizontal plane.

Coherent light for the practice of the holographic method is derived from a laser 16 which may be of the continuous wave type. Its light output is projected to a beam splitter 18. The beam reflected from the splitter 18 is directed to pass through a spatial filter 22 which comprises a pinhole and a lens which in turn projects the beam onto a mirror 24 above the object 12. The mirror 24 projects an area of coherent light onto the planar surface 14 of the object 12.

The other beam passing through the beam splitter 18 is reflected by means of a mirror 20 so as to pass through a second spatial filter assembly 26 and is then reflected to a photographic plate 28 by means of a mirror 30. The photographic plate 28 also receives reflected light from the planar surface 14 by means of the mirror 24. The beam of light projected onto the photographic plate 28 by means of the mirror 30 will be referred to hereinafter as the reference beam while the light reflected in the photographic plate 28 by the illuminated planar surface 14 will be termed the object beam. It should be noted that the path lengths of the reference beam and the object beam should be substantially the same.

The two light systems interfere with one another causing an optical pattern to be recorded on the photographic plate 28. The photographic plate 28 is in a plate holder (not shown) which is adapted to adjust the position of the photographic plate with respect to the other apparatus. This is done by rotating the plate holder or adjusting it along either of a pair of mutually perpendicular lines in a horizontal plane. The plate holder in which the photographic plate is disposed may be of any suitable variety.

In practice of any holographic interferometry techniques, the photographic plate 28 is first placed in the plate holder, the laser is turned on and exposure is made. In the real-time or double exposure methods, this initial exposure is of a length that is dependent upon the speed of the photographic emulsion and the illumination level, and is sufficient to provide adequate recording of the interference pattern between the reference and the object beams without significant object motion.

Following the initial exposure in a real-time analysis, the plate is suitably developed either in situ if the plate holder is so equipped, or by removing it for processing and later reinserting the developed hologram in the plate holder. The laser may then be reinitiated and the virtual image may be seen by viewing through the hologram in the direction of the object. It may be necessary to adjust the relative intensities of the reference and object beam with respect to their intensity during the exposure process.

The mounting stand is then adjusted so as to incline the planar surface 14 with respect to its original position. When viewing the object through the hologram after the object has been rotated, the viewer will see a fine fringe pattern over the entire object which consists of a plurality of parallel straight lines 32 and is illustrated in flG. 2 of the drawings.

It should be noted that the relative movement between the object and the virtual images, as viewed through the hologram, can be obtained by movement of the photographic plate rather than by movement of the stand as hereinbefore described.

Figure 3:
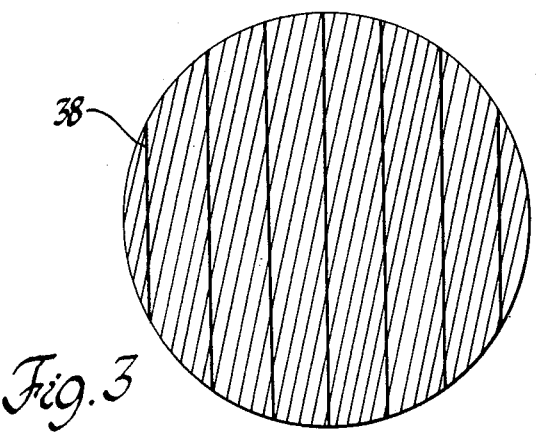
FIG. 3 is an enlarged view of the object viewed through a scale of a predetermined length in which the object has been inclined with respect to the virtual image so as to adjust to spacing between fringes thereby providing a predetermined number of fringes per the predetermined scale length.

A camera is provided at 34 which is adapted to photograph the superimposed images of the object. The ground glass of the camera is replaced by a sheet of translucent plate or sheet 36 with black lines 38 spaced apart at some predetermined scale, e.g., one line every half centimeter. Upon viewing the virtual image superimposed on the real image of the object through the camera, the fringes can be observed between the black lines of translucent plate or sheet. By movement of the object 12 relative to the virtual image, the fringe spacing appearing on the object can be adjusted finer and finer until a predetermined number of fringe spacings appear between each black line 38 as for example, 9 fringe spacings per centimeter as illustrated in FIG. 3 of the drawings.

Figure 4:
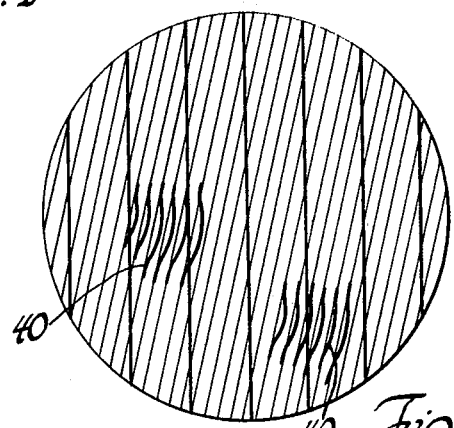
FIG. 4 is an enlarged view of the object in which the object has been subjected to a surface profile change to shift the fringes associated with the changed areas with respect to the areas of the object not subject to change in profile.

A change of surface profile is effected on a portion of the planer surface 14. Upon viewing the object through the hologram, the fringe lines associated with the changed portion, that is, that portion of the surface whose profile was changed, will shift relative to those fringe lines associated with the portion of the surface whose profile was not changed. These fringe shifts are observable in FIG. 4 and are indicated by the numeral 40.

If the change is caused by an etching type of corrosion, the depth of the etch, that is, the depth of the material removed from the planar surface by means of the etching solution, can be determined by the fringe shift as such a shift is a function of the dimensional change in the planar surface. The amount of the shift is measured in a manner which will be described hereinafter. It should be noted that although the fringe lines may appear continuous from outside to inside the changed region, there exists a sharp discontinuity which may not be visible to the eye, but which must be inferred. In the double-exposure technique, the photographic plate is not removed from the holder and developed after the initial exposure, but rather a second exposure is made after the change has been made on the planar surface. After this second exposure, the photographic plate is then removed and developed. The resultant hologram is utilized by illuminating one side with coherent light at approximately the same angle which the reference beam impinged during the exposure process and viewing through the other side of the hologram. A reconstructed image of the object will be seen in which there is created a fine fringe pattern over the object. In those regions in which a change has been applied the fringes will have shifted, and this departure from the unshifted fringes can be measured and related to the magnitude of change in the same manner as that for the real-time technique.

In either technique, after the object has been exposed to a change in surface profile, he object as seen through the hologram, with the virtual image superimposed thereon, is photographed by means of the camera 34. The resultant photograph resembles the hologram illustrated in FIG. 4, that is the fringes will be spaced apart at 9 fringes per centimeter, and the fringe shift at 40 will be readily apparent. After the photograph is properly developed, a millimeter scale is laid across the photograph, placing one index of the scale in the center of a fringe space in the changed area (that area of the surface in which the fringe shift occurred) while reading the fringe displacement from the scale where it extends into the unaffected region of the surface (that area of the surface in which no fringe shift occurred) in the same manner in which one reads a vernier scale.

Figure 5:
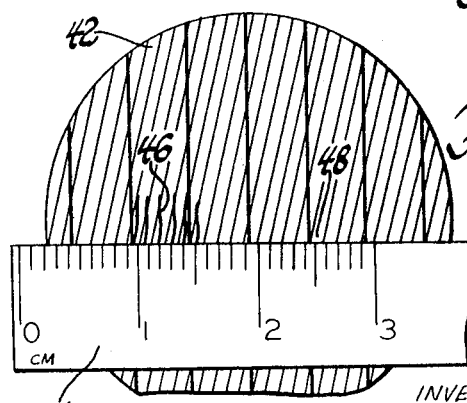
FIG. 5 is an enlarged photograph of the view illustrated in FIG. 4 in which a scale is used to measure the fringe shift in the same manner in which a vernier scale is read.

Referring to FIG. 5 for an illustrative example for measuring the fringe shift, there is shown a photograph 42 of the superimposed images with a millimeter scale 44 laid thereacross. Placing the "1" centimeter line of the scale in the middle of a fringe space at 46 in the changed area, the fringe shift can be read to the right of the shifted region, in the unaffected portion of the surface where a scale line is centered on a corresponding fringe space. In the illustration, the scale line "2.5" is centered on a corresponding fringe space 48 in the unaffected surface area. The fractional fringe shift is, therefore, 0.5 to the right or 0.5 to the left of the fringe space, depending upon which way the fringes seem to be actually shifting relative to the unaffected area. As noted, this method gives a fraction of the fringe shift, for example 0.5 fringes. If several areas are affected by changes of progressive magnitudes, the actual shift can be determined, for example 0.5, 1.5, or 2.5. Once the fringe shift has been determined, the amount of change of surface profile can be calculated by known methods.

The embodiments of the invention in which an exclusive property or privilege is claimed are defined as follows:

1. The method of measuring profile change of a surface of an object comprising: simultaneously exposing a photographic media to a reference beam of coherent light and to an object beam consisting of mutually coherent light reflected from said surface; developing the photographic media so as to form a hologram of said surface; superimposing the virtual image of said surface as seen through the resultant hologram, when the hologram is properly illuminated, with a second image of said surface; shifting said virtual image and said second image of said surface relative to one another forming fringes spaced from each other by a predetermined scale said fringes being a function of the amount of relative shift of said images; subjecting a section of said object to a change of surface profile; observing the shift of the fringes associated with said section; placing a second predetermined scale between a point in said section and a corresponding point in the unchanged portion of said super imposed images, and reading the amount of fringe shift from said second scale at said corresponding point, said fringe shift being a function of the amount of surface profile change.

2. The method of claim 1 wherein the second image of said surface is created in real time by said surface.

3. The method of claim 1 wherein 1 wherein the second image is formed by shifting said surface to a position which is inclined with respect to said surface's original position.

4. The method of claim 1 wherein said second image of said surface occurs as a result of a second exposure of the photographic media simultaneously to a reference beam of coherent light and to an object beam consisting of mutually coherent light reflected from said surface at a time later than the initial exposure of the photographic media after the surface is subjected to said change in profile and before the developing of the photographic media so that the two holograms are recorded in the same photographic media.

5. The method of claim 1 wherein said superimposed images as viewed through said hologram is recorded on a second photographic media after said fringes associated with the said section have shifted; developing said second photographic media; and measuring said fringe displacement from said second photographic media.